United States Patent [19]
Slavin, Jr.

[11] Patent Number: 5,095,639
[45] Date of Patent: Mar. 17, 1992

[54] METHOD OF DRYING WINDSHIELD SHATTER CRACK CAVITIES USING A HAND-HELD RADIANT HEATING DEVICE

[76] Inventor: Barry C. Slavin, Jr., 1166 Lafayette Rd., #A-20, Medina, Ohio 44256

[21] Appl. No.: 439,198

[22] Filed: Nov. 20, 1989

[51] Int. Cl.⁵ .................. B32B 35/00; F26B 3/30; H05B 3/00
[52] U.S. Cl. .................... 34/4; 34/40; 34/243 R; 156/94; 219/228; 392/409
[58] Field of Search ............ 219/227–228, 219/221, 346, 240; 156/94; 34/4, 40, 243 R; 392/409

[56] References Cited

U.S. PATENT DOCUMENTS

| | | | |
|---|---|---|---|
| 1,534,689 | 4/1925 | Cooper | 219/228 |
| 1,603,117 | 12/1926 | Kimmel | 219/346 |
| 2,038,555 | 4/1936 | Eidschum | 219/228 |
| 2,120,696 | 6/1938 | Eldred | 219/346 |
| 3,765,975 | 10/1973 | Hollingsworth | 156/94 |
| 3,841,932 | 10/1974 | Forler | 156/94 |
| 4,047,863 | 9/1977 | McCluskey et al. | 156/94 X |
| 4,569,808 | 2/1986 | Smali | 264/36 |
| 4,924,070 | 5/1990 | Friedman | 219/346 |

FOREIGN PATENT DOCUMENTS

| | | | |
|---|---|---|---|
| 2701848 | 8/1978 | Fed. Rep. of Germany | 219/346 |
| 570075 | 1/1924 | France | 219/228 |
| 722808 | 2/1955 | United Kingdom | 219/346 |

*Primary Examiner*—Anthony Bartis
*Attorney, Agent, or Firm*—Oldham & Oldham Co.

[57] ABSTRACT

A method for drying the cavity in a shatter crack of a multi-layer laminated safety glass prior to repair of the crack utilizes a hand-held radiant heating device. The device includes a housing made of a metallic heat dissipating material and which carries an electrically energized radiant heating coil sized to approximate the diameter of the shatter crack cavity. The housing is affixed to a handle provided with a switch for controlling energization of the coil. In use the device is manually positioned in spaced proximate relationship to the cavity on the same side of the glass as the cavity and the switch is activated to energize the radiant heating coil for a period sufficient to remove water or other liquid resident in the shatter crack cavity.

1 Claim, 1 Drawing Sheet

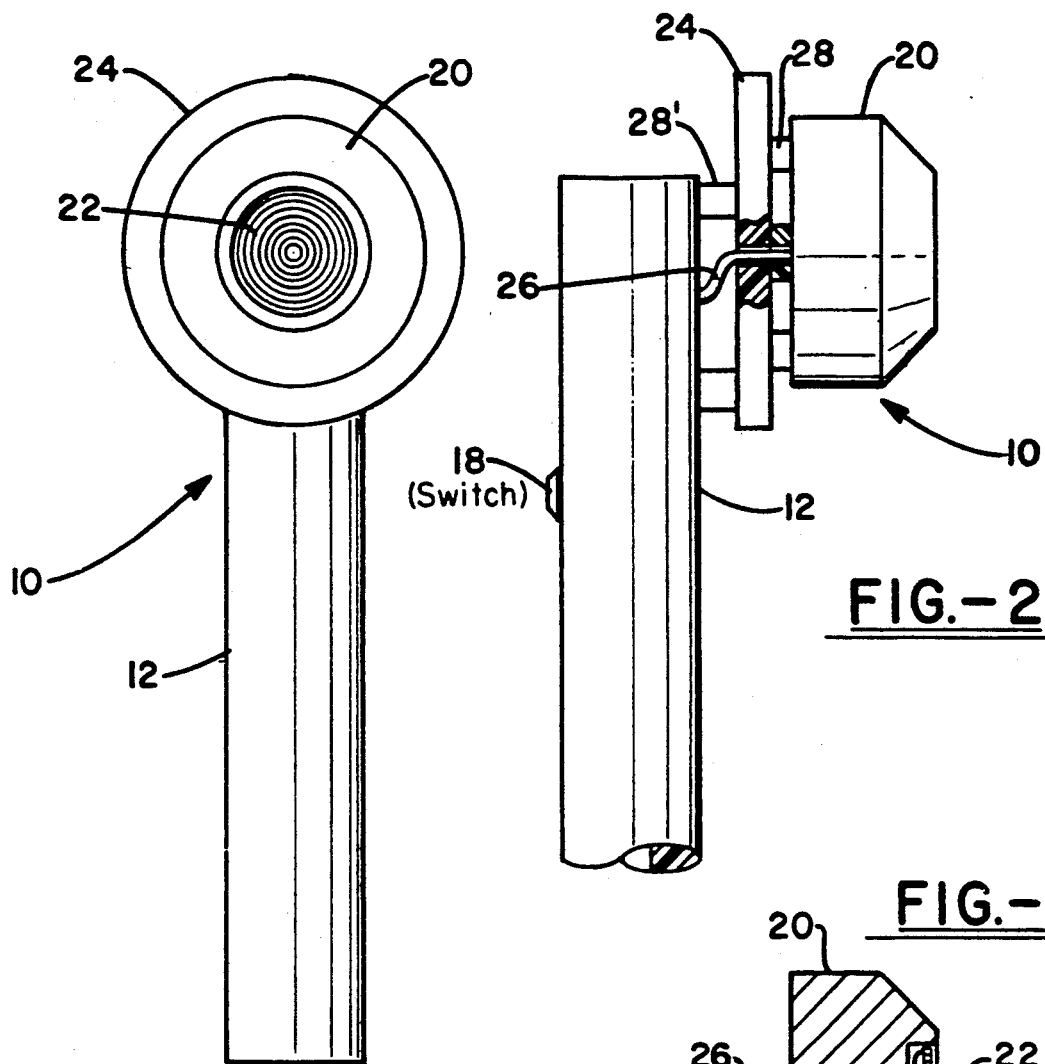
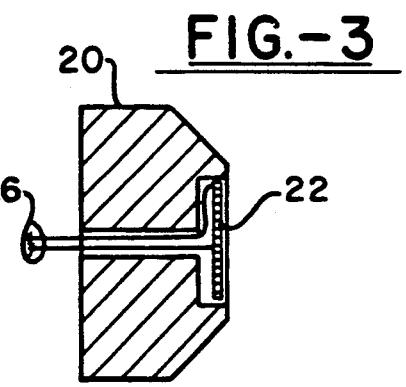
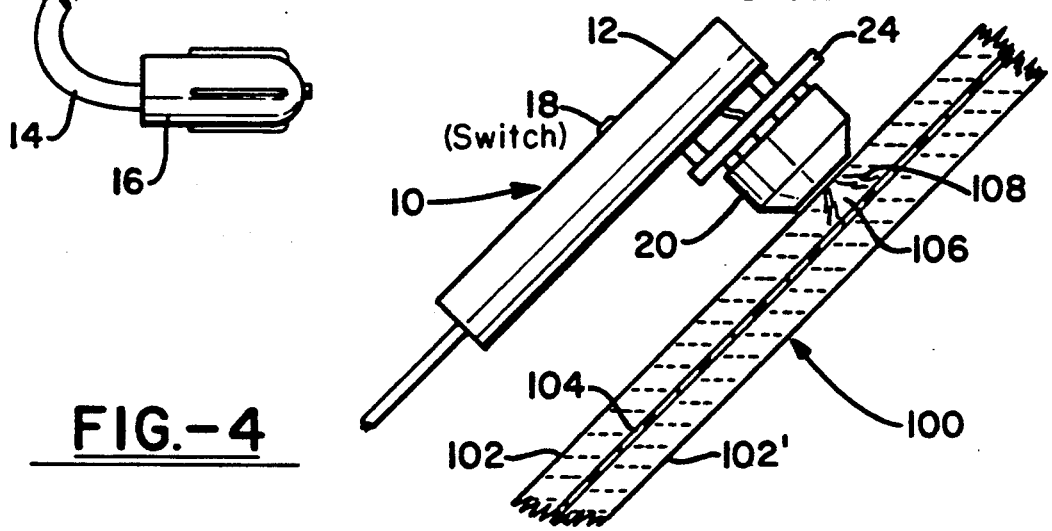

METHOD OF DRYING WINDSHIELD SHATTER CRACK CAVITIES USING A HAND-HELD RADIANT HEATING DEVICE

FIELD OF THE INVENTION

The present invention relates to a device, preferably sized for being held in the hand of a user, for applying a very localized source of radiant heat to the proximity of a plate of multi-layer laminated safety glass having at least one shatter crack therein, and a method of using such device to evaporate water or other liquids that can penetrate the cavity of such crack and cause the crack to spread, requiring replacement of the plate. More specifically, it relates to such removal of water or other liquid to facilitate repair of such shatter crack by conventional known methods. Even more specifically, it relates to such a device wherein the radiant heat is provided by an electrically-powered radiant heat source that is approximately the same diameter as the crack to be dried.

BACKGROUND ART

Most automobile and truck windshields are comprised of a multi-layer laminated safety glass. Such a windshield is typically comprised of inner and outer layers of glass, each laminated to a plastic intermediate layer, commonly composed of a polybutyrate material. When this type of windshield is struck by a piece of flying debris, for example, a small stone or piece of gravel, a shatter crack is likely to occur. Variously in the prior art, such shatter cracks are referred to as "stars", "bullseyes", etc. In the majority of these cases, the integrity of only the outer layer of glass is breached, and the dissipation of the shattering force distributes outward from the point of impact as it moves inwardly toward the glass, resulting in a roughly conical shatter cone directly beneath the point of impact, said cone being separated from the rest of the outer glass pane by a small cavity. The base of the shatter cone itself is usually still firmly affixed to the intermediate plastic layer. As the cavity is usually open at the point of impact to the environment, it is vulnerable to the penetration of water and other materials. If this occurs, the stresses encountered in the glass due to the thermal expansion of the water caused by sunlight and other environmental factors, can result in delamination of the outer glass pane from the intermediate plastic layer, propagation of the crack, or other damages. These damages are particularly bothersome when the shatter crack is located in or near the line of sight of the driver of the vehicle, as they obstruct or distort his or her vision. If the impact damage is not repaired and the crack propagates, many State auto inspection laws will require that the windshield be replaced. This is certainly a costly and undesirable result.

Many U.S. patents teach a method of repairing a shatter crack in a multi-layer laminated safety glass. The preferred method of repair is to fill the cavity area with a liquid polymer resin and to cure the resin in place by the application of heat, ultraviolet radiation, or other curing stimulus, so that the cavity will be sealed with a solid material that blocks further water intrusion or penetration. Further, the polymer simulates the index of refraction of the glass, resulting in a disappearance of the shatter crack. The prior art extensively teaches the need to inject the liquid polymer resin under vacuum conditions to achieve good penetration of the liquid polymer into the cavity.

The inventor of the present invention, however, knows that it is more important to remove trace amounts of water than it is to achieve a good vacuum in effecting a proper repair. If trace amounts of water are sealed into place by the injected polymer, the water, being a virtually incompressible fluid that is subject to large thermal expansion, will cause the crack to propagate, in spite of the repair. Also, it is well known that water may deleteriously affect the proper bonding or setting of certain liquid polymer resins.

At least one patent in the prior art does teach the need for removal of moisture from the cavity. U.S. Pat. No. 3,765,975, to Hollingsworth, teaches a method of cleaning the impact area with a cloth slightly moistened with toluene, methylethyl ketone, or other suitable volatile solvents, and heating under a vacuum. Hollingsworth, in fact, shows a desired temperature and pressure range in FIG. 2 of his patent for effecting a repair. However, Hollingsworth states that a good method of drying off the cavity is to apply "gentle heat" from the reverse surface of the glass. The economics of doing windshield repairs, the present inventor regrets, do not permit the timely techniques taught by Hollinsworth.

Also, the inventor has learned from his experience that it is critically important to use a heat source that is substantially similar in size to the crack to be repaired. Since the impact of the piece of debris that has caused the shatter crack often leaves unrelieved stresses in the glass, a general application of heat to the glass can result in delamination of the glass or propagation of the crack and render the crack unrepairable. One method found to be extremely undesirable as a heat source is the convective heat provided by a conventional portable hair dryer or an open flame, as from a butane torch.

A first object of the present invention is to provide a portable directed source of radiative heat capable of being placed proximate to a plate of laminated safety glass having a shatter crack, to evaporate the water or other liquid contained in the crack for repairing the crack.

A second object of the invention is to provide such a device than can be powered by an electrical supply already available in a vehicle such as an automobile.

A further object is to provide a method for removing water or other liquid contained in the cavity of such a shatter crack.

These and further objects of the present invention are achieved by a device comprising a means for electrically generating radiative heat which is contained in a housing, the housing being affixed to a handle means. The radiative heat means is sized to approximate the diameter of the shatter crack on which the device is intended to be used. The housing comprises a material that conductively dissipates heat. The device further comprises a means for communicating a source of electrical energy communicated to the radiative heat means, with a means for controlling the flow of the electrical energy disposed along the handle means.

Other objects are achieved by a method for removing water or other liquid contained in the cavity of a shatter crack in a plate of multi-layer laminated safety glass, the method comprising: placing a device as described above proximate to the cavity of the safety glass on the same side of the glass as the cavity and energizing the device for a period sufficient to remove the water or other liquid.

BRIEF DESCRIPTION OF THE DRAWINGS

The present invention will be more fully understood when consideration is given to the attached drawings, a brief description of which is now given;

FIG. 1 is a frontal elevation view of the device of the present invention.

FIG. 2 is a side elevation view of the upper portion of the device.

FIG. 3 is a cross-section view of the heater element housing.

FIG. 4 is an elevation view of the device of the present invention, illustrated in operative engagement with a plate of multi-layer laminated safety glass having a shatter crack.

DETAILED DESCRIPTION OF THE DRAWINGS

A hand held heating device 10 the present invention is shown in a frontal elevation view in FIG. 1. The handle means 12 is an elongated, rigid member, preferably with a central cavity located along the longitudinal axis thereof. The cavity is large enough to accommodate a power cord 14, one end of which extends from the lower end of the handle means and is terminated in a plug 16, the plug 16 being suitable for coupling with an electrical power source. As the device is commonly used in relation to a vehicle, one such coupling plug 16 that is preferred is the male plug for drawing electrical power from the conventional cigarette lighter in such vehicles. The other end of the power cord 14 is internal to the handle means 12 and is therein connected to a contact switch 18, not shown in FIG. 1.

Affixed at or near the upper end of the handle means is a housing element 20, preferably metallic and even more preferably formed of aluminum or other metal known for good heat conducting properties. At the largest diameter of the housing element 20, the element will be in the range of 1 to 2 inches in diameter, and at its smallest diameter, the housing element 20 will be in the range of ¼ to 1 inch in diameter. As shown in FIG. 1, the housing element 20 is roughly cylindrical and accommodates a radiative heat coil 22 on its front surface. The preferred material for a radiative heat coil will be a metal that displays high resistance to electricity and can achieve a bright cherry red temperature when electrical energy, preferably 12 volt direct current electrical power, is applied to the electrical leads at the ends thereof. An optional feature of the device 10 is a heat deflector means 24 which is interposed between the housing element 20 and the upper end of the handle means. Such a heat deflector means 24 will be of larger diameter than the largest diameter of the housing element, but should not be of such large diameter as to impede easy use of the device 10. The preferred material of construction of the deflector means will be non-metallic and non-thermoplastic.

Directing attention now to FIG. 2, further aspects of the invention are disclosed in a side elevation view of the device 10. Particularly shown in FIG. 2 is a means for controlling the flow of electricity passing through the power cord 14 from the plug 16 to the radiative heating coil 22. A preferred control means is a contact switch 18. Switch 18 is shown in FIG. 2 as being placed on the handle means in a location on the opposite side of the handle means from the radiative heating coil 22. Switch 18 is also preferably located in a position such that it is operable by the thumb of the user as the user grasp handle means 12. Although various types of contact switches will be known to a person of ordinary skill in the art, the preferred switch is one which permits continuous flow of electricity so long as the switch means is depressed, but electrical flow is interrupted by release of the switch. The two leads of power cord 14 are connected to one side of the contact switch 18 and the two leads of power wires 26 are connected to contact switch 18 on the other side of the switch internally in the handle means. Power wires 26 are in turn connected to the respective leads of radiative heating coil 22 (not shown in FIG. 2, but shown very clearly in FIG. 3) so that when contact switch 18 is depressed, an electrical circuit is made and the resistive element of radiative heating coil 22 causes a temperature rise in the coil and emission of radiative heat.

FIG. 2 also shows side aspects of the housing element 20 and the heat deflector 24. In the preferred embodiment of the device 10, a plurality of spacing means 28 and 28' are used to affix the housing element, the heat deflector and the handle means to each other in that order, but to provide some distance between each.

FIG. 2 also shows that, after connecting with contact switch 18, power wires 26 emerge from the handle means through a hole drilled in the front of handle means 12 through a hole drilled in heat deflector means 24 and into the hole in housing element 20 so as to be able to connect with the leads of radiative heating coil 22.

Referring now to FIG. 3, a cross-section side view of the housing element 20 is disclosed. This figure shows how the radiative heating coil 22 is housed in the front surface of the housing element and how power wires 26 pass through the center of the housing element 20 to connect to the radiative heating coil 22.

FIG. 4 discloses the method of use of the device 10 in the removal of water from a shatter crack in a conventional multi-layered laminated safety glass. The multi-layered safety glass 100 is comprised of an outer glass layer 102 and an inner glass layer 102' with a intermediate plastic layer 104 interposed between the respective glass layers and bonded thereto. The shatter crack caused by a flying object has resulted in a shatter cone 106, which is broadest at the end thereof affixed to the intermediate plastic layer 104 and tapers to a point near the outer surface of the glass layer 102. As a result of the shatter impact, a cavity 108 is present at the interface between the shatter cone 106 and the outer glass layer 102. Exposure to the atmosphere can permit water or other liquid materials to penetrate the cavity 108 and become lodged therein.

In preparing the shatter crack for repair, the hand held heating device 10 is connected to a source of electricity and the radiative heat coil 22 is placed proximate to the shatter cone on the same side of the plate of multi-layered laminated safety glass 100 on which the shatter cone is located. By depressing contact switch 18, electricity is allowed to flow to the radiative heat coil 22 which is heated to a red hot temperature and directed towards the shatter cone area 106 by reflection from the housing element 20. Only a very narrow portion of outer glass layer 102 is heated thereby. Water or other liquid located in cavity 108 is driven off by the heat from radiative heat source 22 and, within a matter of seconds, electricity flow to heating coil 22 may be ceased and the device withdrawn. At that point, repair of the impact damage may be effected by known conventional means.

While in accordance with the patent statutes the preferred and best embodiment of the invention are disclosed herein above, it is obvious that other embodiments and modifications thereof are possible that fall within the teachings of the invention. The scope of the invention is not to be limited to the above description, but is instead to be measured by the appended claims.

I claim:

1. A method for removing water or other liquid contained in the cavity of a shatter crack in a plate of multilayer laminated safety glass, said method comprising:

placing a radiative heat device proximate to the cavity of the safety glass on the same side of the glass as the cavity, said radiative heat device having: (a) a handle means; (b) a means for electrically generating radiative heat sized to approximate the diameter of the shatter crack; (c) a means for housing said radiative heat means, affixed to said handle means and comprising a material that conductively dissipates heat; (d) a means for communicating said radiative heat means to a source of electrical energy; and (e) a means for controlling the flow of electrical energy from said energy source to said radiative heat source, said means for controlling disposed on said handle means; and energizing said radiative heat device for a period sufficient to remove the water or other liquid.

* * * * *